United States Patent
Xia et al.

(10) Patent No.: US 9,342,214 B2
(45) Date of Patent: May 17, 2016

(54) APPARATUS AND METHOD FOR SETTING A TWO HAND MODE TO OPERATE A TOUCHSCREEN

(71) Applicant: SPREADTRUM COMMUNICATIONS (SHANGHAI) CO., LTD, Pudong New Area, Shanghai (CN)

(72) Inventors: Lu Xia, Shanghai (CN); Linna Yin, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/118,055

(22) PCT Filed: Jun. 18, 2013

(86) PCT No.: PCT/CN2013/077390
§ 371 (c)(1),
(2) Date: Nov. 15, 2013

(87) PCT Pub. No.: WO2013/189278
PCT Pub. Date: Dec. 27, 2013

(65) Prior Publication Data
US 2016/0034138 A1   Feb. 4, 2016

(30) Foreign Application Priority Data
Apr. 26, 2013   (CN) .......................... 2013 1 0150736

(51) Int. Cl.
*G06F 3/0482* (2013.01)
*G06F 3/0481* (2013.01)
*G06F 3/0488* (2013.01)
*G06F 3/041* (2006.01)

(52) U.S. Cl.
CPC .......... *G06F 3/04817* (2013.01); *G06F 3/0416* (2013.01); *G06F 3/0482* (2013.01); *G06F 3/04883* (2013.01); *G06F 2203/04803* (2013.01); *G06F 2203/04808* (2013.01)

(58) Field of Classification Search
CPC ...................................................... G06F 3/0482
USPC ......................................................... 715/811
See application file for complete search history.

(56) References Cited

U.S. PATENT DOCUMENTS

| | | | | |
|---|---|---|---|---|
| 2006/0161870 A1* | 7/2006 | Hotelling | .............. | G06F 3/0485 715/863 |
| 2006/0161871 A1* | 7/2006 | Hotelling | .............. | G06F 3/0485 715/863 |
| 2009/0052900 A1* | 2/2009 | Hong | ..................... | G08C 23/04 398/111 |
| 2010/0117970 A1* | 5/2010 | Burstrom | ................ | G06F 3/041 345/173 |
| 2010/0211915 A1* | 8/2010 | Sawai | ................... | G06F 3/0482 715/830 |
| 2011/0077083 A1* | 3/2011 | Ahn | ........................ | A63F 13/10 463/37 |

(Continued)

*Primary Examiner* — Reza Nabi
(74) *Attorney, Agent, or Firm* — Finnegan, Henderson, Farabow, Garrett & Dunner, LLP

(57) ABSTRACT

A method for setting a two hand mode to operate a touchscreen includes: receiving, via the touchscreen, at least one point of contact on the touchscreen generated by one or more fingers of a user, the touchscreen including a plurality of icons; detecting, by at least one processing device, a total number of the points of contact on the touchscreen and respective coordinates of the points of contact; determining, based on the total number of the points of contact and the respective coordinates of the points of contact, whether the user intends to use two hands to operate the touchscreen; and controlling the touchscreen to display the plurality of icons according to a result of the determining.

20 Claims, 5 Drawing Sheets

(56) References Cited

U.S. PATENT DOCUMENTS

| | | | |
|---|---|---|---|
| 2012/0133600 A1* | 5/2012 | Marshall | G06F 19/321 345/173 |
| 2012/0182296 A1* | 7/2012 | Han | G06F 3/04883 345/419 |
| 2013/0038564 A1* | 2/2013 | Ho | G06F 3/0488 345/174 |
| 2014/0055343 A1* | 2/2014 | Kim | G06F 3/005 345/156 |
| 2014/0085188 A1* | 3/2014 | Kim | H04M 1/72522 345/156 |
| 2014/0218298 A1* | 8/2014 | Law | G06F 3/0216 345/168 |
| 2014/0325443 A1* | 10/2014 | Kim | G06F 3/0482 715/825 |
| 2015/0009075 A1* | 1/2015 | Lau | H01Q 21/28 343/702 |
| 2015/0015520 A1* | 1/2015 | Narita | G06F 3/0485 345/173 |
| 2015/0029114 A1* | 1/2015 | Wu | G06F 3/04886 345/173 |
| 2015/0077352 A1* | 3/2015 | Ma | G06F 3/03547 345/173 |

\* cited by examiner

APPARATUS AND METHOD FOR SETTING A TWO HAND MODE TO OPERATE A TOUCHSCREEN

FIELD OF THE DISCLOSURE

This disclosure relates to human-computer interfaces in general and more particularly, to apparatus and method for setting a two hand mode to operate a touchscreen.

BACKGROUND OF THE DISCLOSURE

Electronic devices, such as portable electronic devices, have gained worldwide popularity due to their broad applications. Portable electronic devices may include, for example, smartphones, wireless personal digital assistants (PDAs), tablets, laptop computers with wireless or Bluetooth® capabilities, cellular telephones, etc. A user may use, for example, a smartphone to perform a variety of functions including making telephone calls, sending electronic messages, taking photos, reading articles, and other functions, by installing applications.

With the increasing number of applications, users tend to install more and more applications on their portable electronic devices. At the same time, users have started reading articles and/or news on their portable electronic devices. To accommodate users' various usages, manufacturers have brought into the market portable electronic devices that have relatively large touchscreens to enable rendering of more icons and contents. This, however, gives rise to problems for users who operate portable electronic devices by using one hand. For example, if a user operates a portable electronic device by one hand, and touches the touchscreen of the portable electronic device with a thumb, the thumb of the user may not reach icons that are located far from the thumb location on the touchscreen. In this case, the user may need to instead use both hands to operate the portable electronic device via the touchscreen.

To solve this problem, existing technologies relating to Human-Computer Interaction may provide a settings menu, by which a user sets his/her hand use preference. For example, if a user prefers to use both hands to operate a touchscreen, the user can set a corresponding preference on the settings menu.

However, the existing technologies are not only complicated but also require presetting. Situations may arise in which a user has a need to use both hands, even though the user usually uses one hand to operate a portable electronic device. As an example, when the user is reading an article on the portable electronic device while being a passenger in a vehicle, the user may need to use both hands to avoid shaking or dropping the portable electronic device. Due to this need, the user may not have time to preset a user preference to use both hands. As a result, a user may drop a portable electronic device while only one hand is being used to hold the portable electronic device.

SUMMARY OF THE DISCLOSURE

According to a first aspect of the present disclosure, there is provided a method for setting a two hand mode to operate a touchscreen, comprising: receiving, via the touchscreen, at least one point of contact on the touchscreen generated by one or more fingers of a user, the touchscreen including a plurality of icons; detecting, by at least one processing device, a total number of the points of contact on the touchscreen and respective coordinates of the points of contact; determining, based on the total number of the points of contact and the respective coordinates of the points of contact, whether the user intends to use two hands to operate the touchscreen; and controlling the touchscreen to display the plurality of icons according to a result of the determining.

According to a second aspect of the present disclosure, there is provided an apparatus for setting a two hand mode to operate a touchscreen, comprising: a storage module configured to store computer executable instructions; and a processor, executing the computer executable instruction, configured to: receive, via the touchscreen, at least one point of contact on the touchscreen generated by one or more fingers of a user, the touchscreen including a plurality of icons; detect a total number of the points of contact on the touchscreen, and respective coordinates of the points of contact; determine, based on the total number of the points of contact and the respective coordinates of the points of contact, whether the user intends to use two hands to operate the touchscreen; and control the touchscreen to display the plurality of icons according to a result of the determining.

According to a third aspect of the present disclosure, there is provided a computer-readable medium including instructions, which, when executed by a processor, cause the processor to perform a method for setting a two hand mode to operate a touchscreen, the method comprising: receiving, via the touchscreen, at least one point of contact on the touchscreen generated by one or more fingers of a user, the touchscreen including a plurality of icons; detecting a total number of the points of contact on the touchscreen and respective coordinates of the points of contact; determining, based on the total number of the points of contact and the respective coordinates of the points of contact, whether the user intends to use two hands to operate the touchscreen; and controlling the touchscreen to display the plurality of icons according to a result of the determining.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments and, together with the description, serve to explain principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Exemplary embodiments may take the form of hardware embodiments, or embodiments combining both hardware and software. For example, an apparatus may contain one or more circuits configured to perform a function of setting a two hand mode to operate a touchscreen. As another example, an apparatus may be configured to perform a function of setting a two hand mode to operate a touchscreen by implementing a software application.

Figure 1:
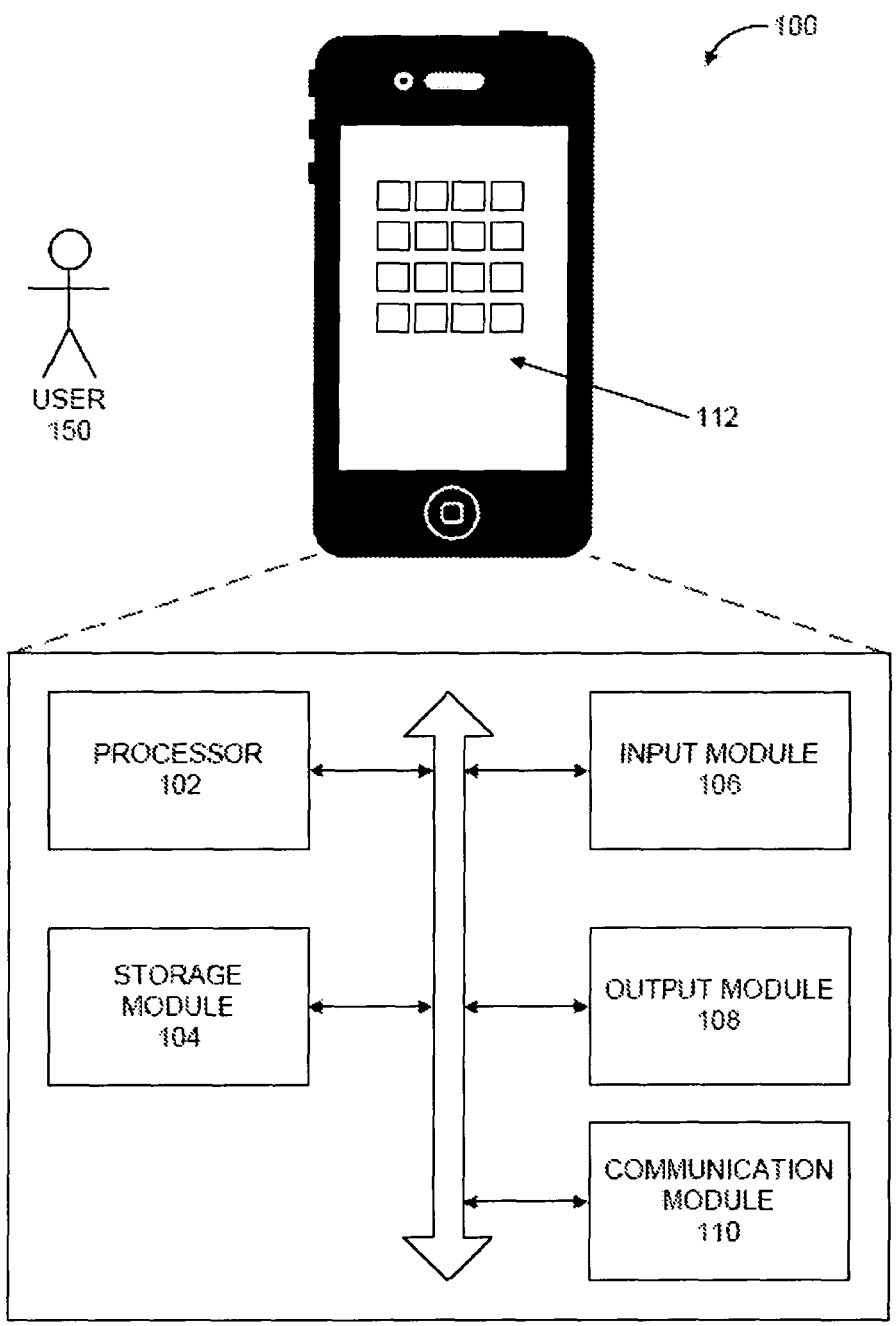
FIG. 1 illustrates a block diagram of an apparatus that enables setting a two hand mode to operate a touchscreen, according to an exemplary embodiment.

FIG. 1 illustrates a block diagram of an apparatus 100 for setting a two hand mode to operate a touchscreen 112 of apparatus 100, according to an exemplary embodiment. Apparatus 100 may be a computing device configured to control a display on touchscreen 112. Apparatus 100 may represent a portable device including, for example, mobile telephones, smartphones, personal digital assistants (PDAs) having wireless communication capability, video game controllers, tablet personal computers (PCs), notebook computers, laptop computers, or any additional or alternative mobile device known in the art configured to include a touchscreen for input and output. FIG. 1 also shows a user 150 to operate apparatus 100.

Apparatus 100 includes one or more processors, such as, for example, processor 102, also known as a central processing unit (CPU). Apparatus 100 also includes a storage module 104, an input module 106, an output module 108, and a communication module 110. Processor 102 may be one or more known processing devices, such as a microprocessor from the Pentium™ family manufactured by Intel™ or the Turion™ family manufactured by AMD™, Processor 102 may include a single core or multiple core processor system that provides the ability to perform parallel processing. For example, processor 102 may be a single core processor that is configured with virtual processing technologies known to those skilled in the art. In certain embodiments, processor 102 may use logical processors to simultaneously execute and control multiple processes. Processor 102 may implement virtual machine technologies, or other similar known technologies, to provide the ability to execute, control, run, manipulate, store, etc., multiple software processes, applications, programs, etc. In another embodiment, processor 102 includes a multiple-core processor arrangement (e.g., dual or quad core) that is configured to provide parallel processing functionalities to allow apparatus 100 to execute multiple processes simultaneously. One of ordinary skill in the art would understand that other types of processor arrangements could be implemented that provide for the capabilities disclosed herein.

Storage module 104 includes one or more storage devices configured to store information used by processor 102 (or another component) to perform certain functions according to exemplary embodiments. The one or more storage devices may include, for example, a hard drive, a flash drive, an optical drive, a random-access memory (RAM), a read-only memory (ROM), or any other computer-readable medium known in the art. Storage module 104 can store instructions to enable processor 102 to execute one or more applications, network communication processes, and any other type of application or software known to be available on computing devices. Additionally or alternatively, instructions, application programs, etc., may be stored in an external storage or available from a memory over a network. The one or more storage devices of storage module 104 may be volatile or non-volatile, magnetic, semiconductor, optical, removable, non-removable, or other type of storage device or tangible computer-readable medium.

Input module 106 includes one or more input devices and/or mechanisms to receive input from user 150. For example, input module 106 may include a keyboard, a keypad, a mouse, a joystick, a stylus, a button, a thumbwheel, a touchscreen, or any other input device configured to receive input from user 150. In exemplary embodiments, input module 106 may include touchscreen 112, which is configured to detect touch gestures of user 150 and convert the touch gestures to electronic signals for controlling the display on touchscreen 112.

Output module 108 includes a display device, a speaker, a vibration generator, or any other output device known in the art. In exemplary embodiments, output module 108 is configured to provide feedback to user 150. For example, output module 108 may be configured to receive signals from processor 102 and generate a graphical user interface screen including a plurality of graphical elements. These graphical elements may include, for example, icons associated with applications installed on apparatus 100 and stored in storage module 104, menus, buttons, sliding bars, interface controls, etc. In exemplary embodiments, touchscreen 112 is configured to function as output module 108, on which the plurality of graphical elements are displayed.

Communication module 110 is configured to communicate with a telephone network, a wireless cellular network, or a computer network as known in the art. For example, communication module 110 may include a modem configured to provide network communication with a telephone network or a wireless cellular network. Alternatively, communication module 110 may include an Ethernet interface, a Wi-Fi interface, or a Bluetooth® interface to provide network communication with an Ethernet, a local area network (LAN), a wide area network (WAN), or any other computer networks.

In exemplary embodiments, user 150 operates apparatus 100 through touchscreen 112 using, for example, hands or fingers. User 150 touches touchscreen 112 with one or more fingers while operating apparatus 100. The one or more fingers of user 150 generate at least one point of contact on touchscreen 112. Processor 102 is configured to detect the coordinates of the point(s) of contact generated by the one or more fingers of user 150 according to the electronic signals generated by touchscreen 112. In further exemplary embodiments, if user 150 uses four fingers, processor 102 can be configured to determine whether user 150 intends to use two hands, based on respective coordinates of the points of contact generated by the four fingers on touchscreen 112.

Figure 2:
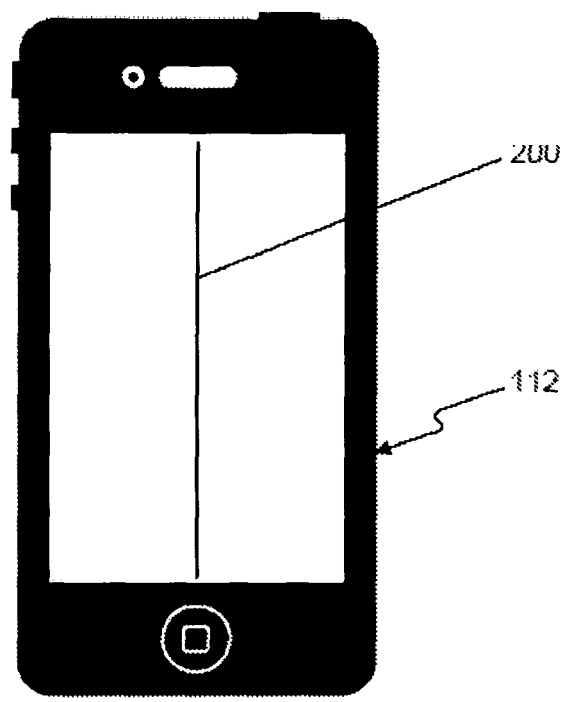
FIG. 2 illustrates a dividing line in the middle of a touchscreen, according to an exemplary embodiment.

In exemplary embodiments, processor 102 is configured to determine an invisible dividing line on touchscreen 112 ("dividing line"). According to the illustrated embodiments, processor 102 can be configured to determine a dividing line 200 in the middle of touchscreen 112 based on coordinate information, as shown in FIG. 2.

Figure 3A:
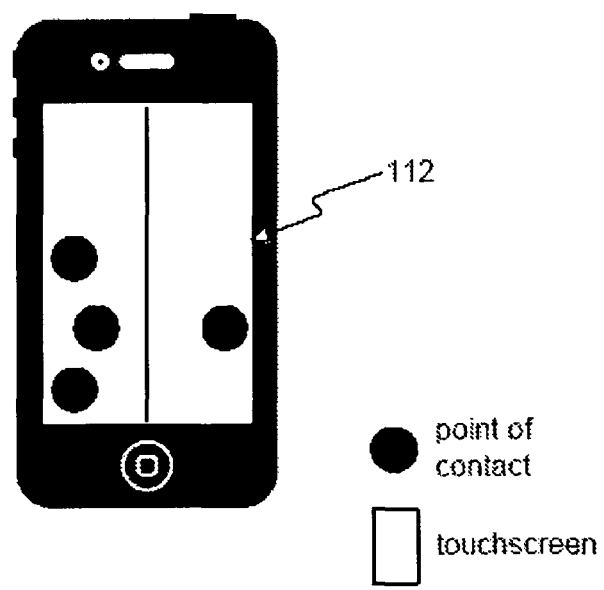
FIGS. 3A and 3B illustrate methods for setting a two hand mode to operate a touchscreen, according to an exemplary embodiment.

In one exemplary embodiment, processor 102 is configured to use dividing line 200 to determine whether user 150 intends to use two hands to operate touchscreen 112 of apparatus 100. For example, if user 150 uses four fingers to touch touchscreen 112, four points of contact are generated on touchscreen 112. As shown in FIG. 3A, if the coordinates of one point of contact fall to the right side of dividing line 200, and the respective coordinates of the other three points of contact all fall to the left side of dividing line 200, processor 102 is configured to determine that user 150 intends to use two hands.

Figure 3B:
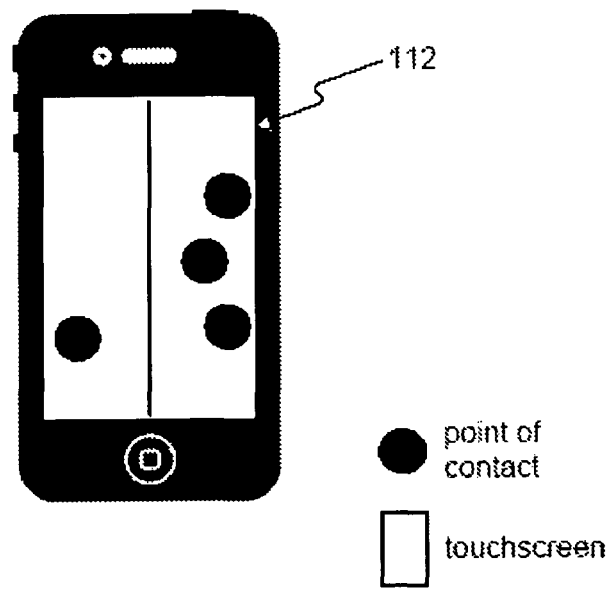

In another exemplary embodiment, as shown in FIG. 3B, if the coordinates of one point of contact fall to the left side of dividing line 200, and the respective coordinates of the other three points of contact all fall to the right side of dividing line 200, processor 102 is configured to determine that user 150 intends to use two hands.

Figure 4:
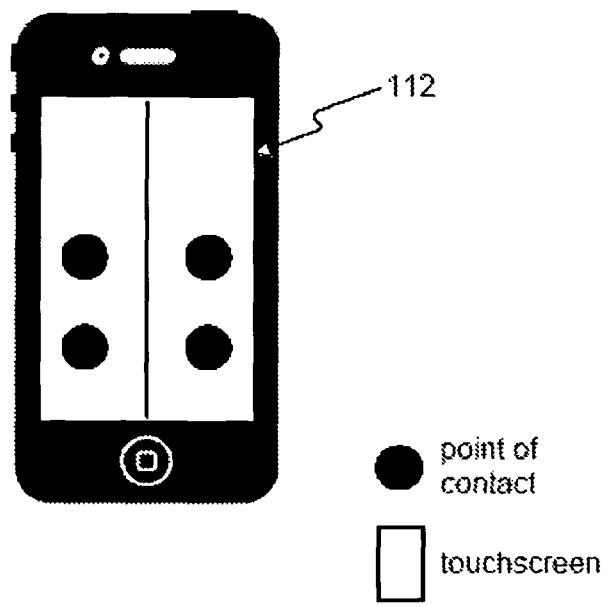
FIG. 4 illustrates a method for setting a two hand mode to operate a touchscreen, according to another exemplary embodiment.

Additionally or alternatively, as shown in FIG. 4, if the coordinates of two points of contact fall to the left side of dividing line 200, and the coordinates of the other two points of contact fall to the right side of dividing line 200, processor 102 is configured to determine that user 150 intends to use two hands.

Thus, if processor 102 determines that user 150 intends to use two hands to operate touchscreen 112, processor 102 is configured to cause touchscreen 112 to display an interface screen notifying user 150 that touchscreen 112 is set in a two hand operation mode.

Figure 5:
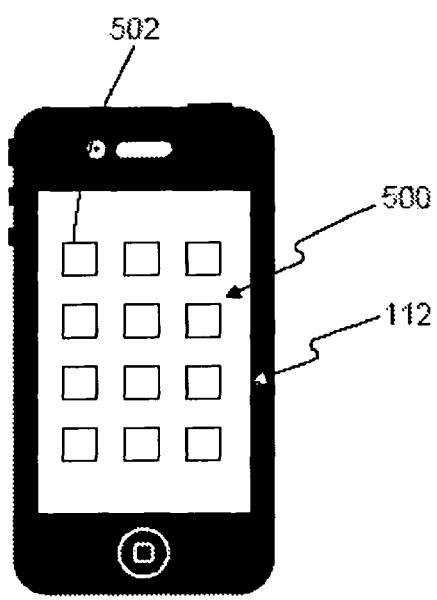
FIG. 5 shows icons displayed on a touchscreen based on a result of setting a two hand mode to operate a touchscreen, according to an exemplary embodiment.

In exemplary embodiments, processor 102 is configured to control a display on touchscreen 112 of apparatus 100, as a result of setting a two hand mode to operate touchscreen 112. According to the illustrated embodiments, processor 102 is configured to cause touchscreen 112 to display the icons in a layout that facilitates the thumbs and/or the fingers of user 150 reaching all of the icons on touchscreen 112. FIG. 5 shows a display 500 of icons 502 on touchscreen 112 as a result of setting a two hand mode to operate touchscreen 112, according to an exemplary embodiment. As shown in FIG. 5, processor 102 is configured to cause touchscreen 112 to display icons 502 in a grid layout. However, processor 102 can be configured to display icons 502 in other layouts that facilitate access during operation of touchscreen 112 in the two hand mode. If processor 102 determines that user 150 does not intend to use two hands, and therefore a two hand mode is not set to operate touchscreen 112, processor 102 is configured to cause touchscreen 112 to maintain its default layout. For example, in the default layout, icons 502 can be displayed in the bottom corner area of either the left or the right side of touchscreen 112.

Additionally or alternatively, processor 102 can determine whether user 150 intends to use two hands to operate touchscreen 112 by detecting whether user 150 presses a button. In one exemplary embodiment, apparatus 100 is configured to include a button on either the left or the right side. If user 150 intends to use both hands, user 150 presses the button. Functions regarding displaying the icons are the same as or similar to those exemplary embodiments provided above, and the detailed description is therefore omitted.

Figure 6:
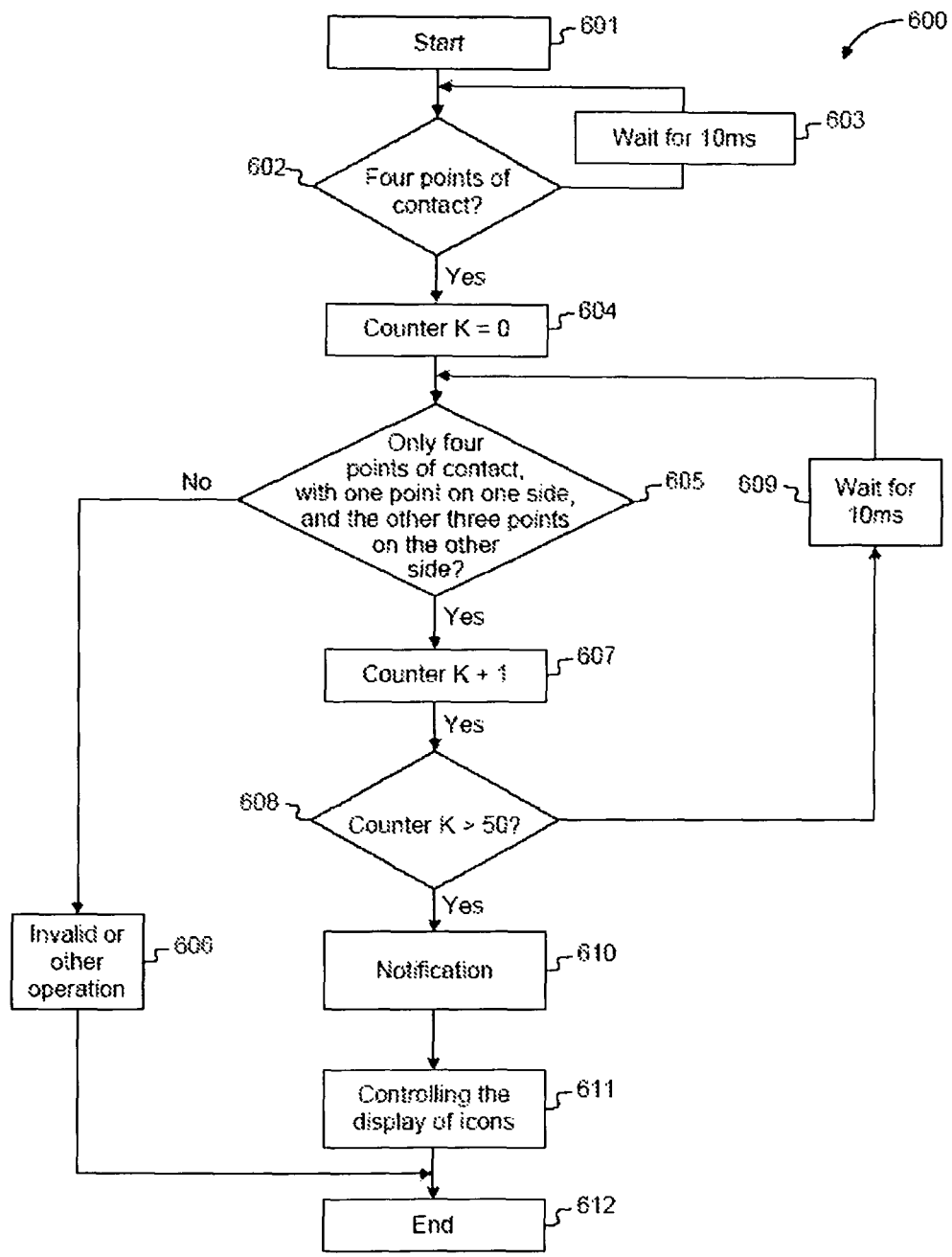
FIG. 6 illustrates a flow chart of a process for setting a two hand mode to operate a touchscreen, according to an exemplary embodiment.

FIG. 6 illustrates a flow chart of a process 600 for setting a two hand mode to operate touchscreen 112, according to an exemplary embodiment. Process 600 is performed by processor 102 according to computer-executable instructions stored in storage module 104. In one exemplary embodiment, user 150 starts process 600 by touching touchscreen 112. In the illustrated embodiments, user 150 uses one or more fingers to touch touchscreen 112, and processor 102 is configured to detect that user 150 is touching touchscreen 112 (step 601).

When user 150 touches touchscreen 112 with one or more fingers, at least one point of contact is generated on touchscreen 112. Processor 102 is configured to determine the number of points of contact generated by the one or more fingers of user 150. In one exemplary embodiment, user 150 may use four fingers to operate touchscreen 112. In this exemplary embodiment, processor 102 can be configured to determine whether there are four points of contact on touchscreen 112 generated by the four fingers of user 150 (step 602).

To filter noise (e.g., accidental touching or touching not by user 150), processor 102 is configured to wait for a predetermined period of time before confirming that there are four points of contact on touchscreen 112 generated by user 150. For example, processor 102 waits for 10 ms before confirming whether there are four points of contact generated on touchscreen 112 (step 603).

If processor 102 confirms that there are four points of contact on touchscreen 112, processor 102 initiates a counter K at a value of 0 (step 604).

Processor 102 is configured to check the total number of the points of contact and their coordinates to determine whether user 150 intends to use two hands to operate touchscreen 112. For example, the predetermined total number of the points of contact can be four, but another number could be the total number of the points of contact for determining whether user 150 intends to use two hands. If the total number of the points of contact is predetermined to be four, processor 102 is configured to check whether there are only four points of contact. In such a case, processor 102 is also configured to detect the coordinates of the four points of contact to determine whether user 150 intends to use two hands to operate touchscreen 112 (step 605). For example, processor 102 can be configured to determine whether the coordinates of one point of contact fall on one side (either the left side or the right side) of touchscreen 112, and respective coordinates of the other three points of contact all fall on the other side of touchscreen 112. As another example, if the total number of the points of contact is predetermined to be four, processor 102 can be configured to determine whether the coordinates of two points of contact fall on one side of touchscreen 112, and the coordinates of the other two points of contact fall on the other side of touchscreen 112.

In an exemplary embodiment, if processor 102 determines that there are greater or fewer than a predetermined total number of points of contact detected on touchscreen 112, and/or the distribution of the points of contact are not consistent with a predetermined distribution, processor 102 is configured to determine that an invalid operation or other operation has occurred (step 606). For example, if the predetermined total number of points of contact is four, and processor 102 determines that there are greater or fewer than four points of contact detected on touchscreen 112, processor 102 can be configured to determine that an invalid operation or other operation has occurred. While processor 102 determines that there are only four points of contact on touchscreen 112, if the distribution of the points of contact is not with one point of contact on one side and three points of contact on the different side of touchscreen 112, or with two points of contact on one side and the other two points of contact on the other side of touchscreen 112, processor 102 is configured to determine that an invalid operation or other operation has occurred. In such case, the process flows to step 612.

In another exemplary embodiment, while processor 102 is determining whether there are only four points of contact on touchscreen 112, and the coordinates of one point of contact fall on one side (either the left side or the right side) of touchscreen 112, and the respective coordinates of the other three points of contact all fall on the other side of touchscreen 112, the counter K is incremented by 1 ms (step 607).

Processor 102 is configured to determine whether the counter K has incremented to a predetermined period of time, such as, for example, 50 ms (step 608). If counter K has incremented to a number exceeding 50 ms, processor 102 is configured to wait for a predetermined period of time, such as, for example, 10 ms. After waiting for 10 ms, processor 102 is configured to determine whether there are only four points of contact, and whether the coordinates of one point of contact fall on one side (left or right) of touchscreen 112, and the respective coordinates of the other three points of contact all fall on the other side of touchscreen 112 (step 609).

According to the illustrated embodiments, if processor 102 confirms that there are only four points of contact, and the coordinates of one point of contact fall on one side of touchscreen 112, and the respective coordinates of the other three points of contact all fall on the other side of touchscreen 112, processor 102 can be configured to cause touchscreen 112 to display a screen interface notifying user 150 that touchscreen 112 has been set in a two hand operation mode (step 610).

Processor 102 is configured to control the display of icons on touchscreen 112 if user 150 has set a two hand mode to operate touchscreen 112 (step 611). For example, as shown in FIG. 5, if processor 102 determines that user 150 intends to use both hands to operate touchscreen 112, processor 102 is configured to cause touchscreen 112 to display icons 502 on touchscreen 112 in, for example, a grid layout. However, the layout for displaying the icons on touchscreen 112 is not limited to the grid layout. If processor 102 determines that user 150 does not intend to use two hands, and therefore a two hand mode is not set to operate touchscreen 112, processor 102 can be configured to cause touchscreen 112 to maintain its default layout. For example, in the default layout, icons 502 can be displayed in the bottom corner area of either the left or the right side of touchscreen 112.

Although exemplary embodiments require four points of contact, the invention is not so limited. Embodiments consistent with the invention can be practiced with greater of fewer than four points, as well as various distribution with such points on touchscreen 112.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for setting a two hand mode to operate a touchscreen, comprising:
   receiving, via the touchscreen, at least one point of contact on the touchscreen generated by one or more fingers of a user, the touchscreen including a plurality of icons;
   detecting, by at least one processing device, a total number of the points of contact on the touchscreen and respective coordinates of the points of contact;
   determining, based on the total number of the points of contact and the respective coordinates of the points of contact, whether the user intends to use two hands to operate the touchscreen; and
   controlling the touchscreen to display the plurality of icons according to a result of the determining.

2. The method of claim 1, further comprising determining a dividing line in the middle of the touchscreen, and
   wherein the determining whether the user intends to use two hands to operate the touchscreen further comprises determining a relationship between the respective coordinates of the points of contact and the dividing line.

3. The method of claim 2, further comprising determining the user intends to use two hands to operate the touchscreen if:
   the total number of the points of contact is four; the coordinates of one point of contact fall to the left side of the dividing line; and the respective coordinates of the other three points of contact all fall to the right side of the dividing line.

4. The method of claim 2, further comprising determining the user intends to use two hands to operate the touchscreen if:
   the total number of the points of contact is four;
   the coordinates of one point of contact fall to the right side of the dividing line; and
   the respective coordinates of the other three points of contact all fall to the left side of the dividing Line.

5. The method of claim 2, further comprising determining the user intends to use two hands to operate the touchscreen if:
   the total number of points of contact is four;
   the coordinates of two points of contact fall to the left side of the dividing line; and
   the coordinates of the other two points of contact fall to the right side of the dividing line.

6. The method of claim 1, further comprising:
   setting, if a result of the determining is that the user intends to use two hands to operate the touchscreen, the touchscreen to operate in the two hand mode; and
   controlling the touchscreen to display the plurality of icons in a grid layout.

7. The method of claim 1, further comprising generating an interface screen notifying the user that the touchscreen is set in the two hand operation mode, if a result of the determining is that the user intends to use two hands to operate the touchscreen.

8. An apparatus for setting a two hand mode to operate a touchscreen, comprising:
   a storage module configured to store computer executable instructions; and
   a processor, executing the computer executable instruction, configured to:
   receive, via the touchscreen, at least one point of contact on the touchscreen generated by one or more fingers of a user, the touchscreen including a plurality of icons;
   detect a total number of the points of contact on the touchscreen, and respective coordinates of the points of contact;
   determine, based on the total number of the points of contact and the respective coordinates of the points of contact, whether the user intends to use two hands to operate the touchscreen; and
   control the touchscreen to display the plurality of icons according to a result of the determining.

9. The apparatus of claim 8, wherein the processor is further configured to:
   determine a dividing line in the middle of the touchscreen; and
   determine a relationship between the respective coordinates of the points of contact and the dividing line.

10. The apparatus of claim 9, wherein the processor is further configured to determine the user intends to use two hands to operate the touchscreen if: the total number of the points of contact is four; the coordinates of one point of contact fall to the left side of the dividing line; and the respective coordinates of the other three points of contact all fall to the right side of the dividing line.

11. The apparatus of claim 9, wherein the processor is further configured to determine the user intends to use two hands to operate the touchscreen if: the total number of the points of contact is four; the coordinates of one point of contact fall to the right side of the dividing line; and
the respective coordinates of the other three points of contact all fall to the left side of the dividing line.

12. The apparatus of claim 9, wherein the processor is further configured to determine the user intends to use two hands to operate the touchscreen if: the total number of the points of contact is four; the coordinates of two points of contact fall to the left side of the dividing line; and the coordinates of the other two points of contact fall to the right side of the dividing line.

13. The apparatus of claim 8, wherein the processor is further configured to:
set, if a result of the determining is that the user intends to use two hands to operate the touchscreen, the touchscreen to operate in the two hand mode; and
control the touchscreen to display the plurality of icons in a grid layout.

14. The method of claim 1, wherein the processor is further configured to generate an interface screen notifying the user that the touchscreen is set in the two hand operation mode, if a result of the determining is that the user intends to use two hands to operate the touchscreen.

15. A non-transitory computer-readable medium including instructions, which, when executed by a processor, cause the processor to perform a method for setting a two hand mode to operate a touchscreen, the method comprising:
receiving, via the touchscreen, at least one point of contact on the touchscreen generated by one or more fingers of a user, the touchscreen including a plurality of icons;
detecting a total number of the points of contact on the touchscreen and respective coordinates of the points of contact;
determining, based on the total number of the points of contact and the respective coordinates of the points of contact, whether the user intends to use two hands to operate the touchscreen; and
controlling the touchscreen to display the plurality of icons according to a result of the determining.

16. The computer-readable medium of claim 15, the method further comprising determining a dividing line in the middle of the touchscreen, and
wherein the determining whether the user intends to use two hands to operate the touchscreen further comprises determining a relationship between the respective coordinates of the points of contact and the dividing line.

17. The computer-readable medium of claim 16, the method further comprising determining the user intends to use two hands to operate the touchscreen if:
the total number of the points of contact is four;
the coordinates of one point of contact fall to one side of the dividing line; and the respective coordinates of the other three points of contact all fall to the other side of the dividing line.

18. The computer-readable medium of claim 16, the method further comprising determining the user intends to use two hands to operate the touchscreen if: the total number of points of contact is four; the coordinates of two points of contact fall to the left side of the dividing line; and the coordinates of the other two points of contact fall to the right side of the dividing line.

19. The computer-readable medium of claim 15, the method further comprising:
setting, if a result of the determining is that the user intends to use two hands to operate the touchscreen, the touchscreen to operate in the two hand mode; and
controlling the touchscreen to display the plurality of icons in a grid layout.

20. The computer-readable medium of claim 15, the method further comprising generating an interface screen notifying the user that the touchscreen is set in the two hand operation mode, if a result of the determining is that the user intends to use two hands to operate the touchscreen.

* * * * *